3,109,824
METHOD OF DISSOLVING POLYURETHANES AND POLYUREAS USING TALL OIL
Herbert L. Heiss, New Martinsville, W. Va., assignor to Mobay Chemical Company, Pittsburgh, Pa., a corporation of Delaware
No Drawing. Filed Nov. 14, 1960, Ser. No. 68,661
7 Claims. (Cl. 260—2.3)

This invention relates to a method of dissolving polyurethanes and/or polyureas and more particularly, to a method of reacting polyurethanes and/or polyureas so that they may be used for the production of new and useful materials.

It has been proposed heretofore to dissolve cellular polyurethane plastics in liquid active hydrogen containing materials which can then be used to prepare new cellular products in the same manner as the material which contains no dissolved cellular polyurethane. For example, according to the process of U.S. Patent 2,937,151 a linear hydroxyl polyester having a maximum acid number of 1 is used to dissolve a cellular polyurethane plastic. Furthermore, it is necessary to heat the cellular polyurethane in the resin to a temperature above about 250° C. or for long times above about 200° C. to bring about even partial dissolution and this latter high temperature causes discoloration of the resulting resin because it is so near the decomposition temperature of the cellular polyurethane plastic.

It is therefore an object of this invention to provide a method of dissolving polyurethanes and/or polyureas which is not subject to these disadvantages. It is another object of this invention to provide particular materials which will insure the dissolution and liquefaction of polyurethanes and/or polyureas. Still another object of this invention is to provide an improved method of liquefying polyurethanes and polyureas without the necessity of employing a catalyst. A further object of the invention is to provide a method of preparing liquid products suitable for use in the preparation of plastics and the like from scrap or waste polyurethane and/or polyurea plastics.

The foregoing objects and others which will become apparent from the following description are accomplished in accordance with the invention, generally speaking, by providing a method of dissolving a polyurethane and/or polyurea by heating the same with a carboxylic acid having a molecular weight below about 5000 and an acid number above about 25 in the liquid phase. Thus, this invention provides particular carboxylic acids which will completely dissolve a polyurethane and/or polyurea by reaction therewith to yield liquid organic polymers suitable for use as coatings, adhesives, plasticizers and the like.

Any suitable carboxylic acid may be used which has a molecular weight below about 5000 and an acid number above about 25. The carboxylic acids should preferably have an acid number within the range of from about 50 to about 800. The rate of the reaction is somewhat dependent on the relative proportions of the carboxylic acid groups and urethane and/or urea groups. Therefore, the higher the acid number in proportion to the number of urethane and/or urea groups present, the faster the reaction and the greater the benefit received from the process of this invention in rapidly dissolving polyurethanes and/or polyureas. If the acid number is below about 25, very little, if any, of the polyurea of polyurethane will be dissolved at temperatures below about 200° C. The carboxylic acid should have a melting point below 150° C. It is necessary for the carboxylic acid media to be liquid at this temperature, which is the minimum temperature for the dissolution of the polyurethane and/or polyurea. Moreover, the carboxylic acid should have a boiling point above about 150° C. at the operating pressure so that it will be liquid at the reaction temperature.

Examples of carboxylic acids are fatty acids, rosin acids, polymerized unsaturated acids, polycarboxylic acids, aromatic monocarboxylic acids, heterocyclic acids, mixtures of these acids and the like. Any suitable fatty acid may be used, but it is preferred to use those which contain from 4 to 18 carbon atoms such as, for example, butyric acid, valeric acid, caproic acid, enanthic acid, caprylic acid, pelargonic acid, capric acid, n-undecyclic acid, lauric acid, n-tridecylic acid, myristic acid, n-pentadecylic acid, palmitic acid, margaric acid, stearic acid, n-nonadecyclic acid and the various positional isomers thereof. Any suitable rosin acid may be used such as, for example, abietic acid, levopimaric acid, neoabietic acid, dehydroabietic acid, dextropimaric acid, isodextropimaric acid, pimaric acid and the like. Any suitable polymerized unsaturated fatty acid may be used such as, for example, dimerized oleic acid, dimerized ricinoleic acid and the like. Any suitable polycarboxylic acid may be used such as, for example, malonic acid, succinic acid, glutaric acid, adipic acid, pimelic acid, suberic acid, azelic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, mellitic acid, 1,4-cyclohexanedicarboxylic acid, naphthalic acid, 3,4,9,10-perylenetetracarboxylic acid, dinicotinic acid, acridinic acid, 3,4-quinolinedicarboxylic acid, glycollic acid and the like. Any suitable aromatic monocarboxylic acid may be used such as, for example, benzoic acid, 1-naphthoic acid, 2-naphthoic acid, o-toluic acid, m-toluic acid, p-toluic acid, o-chlorobenzoic acid, m-chlorobenzoic acid, p-chlorobenzoic acid, o-nitrobenzoic acid, m-nitrobenzoic acid, p-nitrobenzoic acid, 3,5-dinitrobenzoic acid and the like. Any suitable heterocyclic acid may be used such as, for example, picolinic acid, furoic acid, 2-thiophenecarboxylic acid and the like. Any suitable mixture containing acids may be used such as, for example, tall oil, tall oil pitch, stearine pitch, fish oil pitch, cottonseed pitch, linseed pitch, soya pitch and the like. In accordance with a preferred embodiment of the invention, tall oil is used because tall oil makes it possible to operate at very low temperatures below about 200° C. and still achieve complete dissolution of the polyurea and/or polyurethane plastic in a relatively short time.

Any suitable polyurethane or polyurea may be dissolved by the method of this invention. Either a liquid or solid polyurethane and/or polyurea may be used. Suitable polyurethanes are, for example, cellular polyurethanes, substantially non-porous polyurethanes and prepolymers which contain urethane groups. Any suitable polyurea may be used such as is obtained, for example, by the reaction of an organic polyisocyanate with an amine. Suitable cellular polyurethane plastics are obtained, for example, by reacting an organic polyisocyanate with an organic compound containing at least two active hydrogen containing groups as determined by the Zerewitinoff method in the presence of a blowing agent. Either the prepolymer technique or the so-called one-shot method wherein all of these components are combined in a single step may be used. Suitable processes for the preparation of cellular polyurethane plastics are disclosed in U.S. Reissue Patent 24,514 and U.S. Patent 2,948,691.

Any suitable substantially non-porous polyurethane plastic may be used such as those obtained for example by the reaction of an organic compound containing at least two active hydrogen containing groups as determined by the Zerewitinoff method with an excess of an organic polyisocyanate in a first step and the reacting the resulting prepolymer containing terminal isocyanate groups with a cross-linking agent such as water, an alkylene glycol or a diamine in accordance with the process disclosed in U.S. Patents 2,729,618, 2,620,516, 2,621,166 and 2,900,368. The prepolymers employed in any of the foregoing patents will undergo reaction similar to the solid products resulting in complete dissolution of polyurethane in the carboxylic acid.

Any suitable polyurea may be used and indeed there are urea groups present in cellular polyurethane plastics which are prepared from organic polyisocyanates, water and organic compounds containing active hydrogen containing groups. These urea groups result from the reaction between water and isocyanate groups. Urea groups obtained by any other process and polymers which contain urea groups and/or urethane groups are dissolved by the method of the invention such as, for example, the polymer obtained from an organic diisocyanate such as 2,4-toluylene diisocyanate and a polyamine such as di-3-(aminopropyl)-ether of tripropylene glycol.

The process of the invention involves simply combining the carboxylic acid and the polyurethane and/or polyurea. It is preferred to heat the carboxylic acid and then add the polyurethane and/or polyurea in a vented container with the exclusion of air. The acid is heated to a temperature above about 150° C., preferably above about 200° C. and the polyurea or polyurethane is added thereto. Gas is given off during the reaction. Reaction times vary somewhat depending on the concentration of acid groups as more particularly pointed out above, the degree of subdivision of the polyurethane and/or polyurea and the relative amount of urethane groups and/or urea groups in comparison with the amount of carboxylic acid groups. This relative proportion will determine the degree of degradation of the polyurethane or polyurea. If nearly an equivalent number of carboxylic groups and urea and/or urethane groups are present and assuming the reaction is allowed to go to completion then complete degradation of the polymer will occur at a reaction temperature above about 150° C. It is preferred to agitate the reaction mixture. Normally, the reaction is continued until gas evolution essentially ceases at which time a resinous product is obtained which may be used for the preparation of new resins, glues, coatings or as a plasticizer or modifying agent in the preparation of new polyurethane and/or polyurea plastics.

The final products are useful in the preparation of foams, laminated materials, coated substrates such as wood, metal and the like.

The invention is further illustrated by the following examples in which the parts are by weight unless otherwise indicated.

*Example 1*

(a) A cellular polyurethane plastic is prepared as follows: About 100 parts of a trihydric polyalkylene ether prepared from about 1 part of glycerine and about 30 parts of propylene oxide by condensation thereof to a molecular weight of about 3000 and having an hydroxyl number of about 56 are mixed with about 40 parts of a mixture of 80 percent 2,4- and 20 percent 2,6-toluylene diisocyanate, about 0.35 part of stannous octoate, about 0.35 part N-ethyl morpholine, about 0.05 part of 1-methyl-4-dimethyl amino ethyl piperazine, about 1 part of a silicone oil having the formula

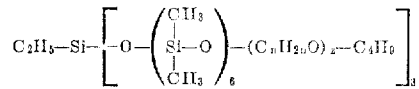

wherein $(C_nH_{2n}O)$ represents about 17 oxyethylene units and about 13 oxypropylene units and z is equal to about 30 are also mixed with the other ingredients substantially simultaneously, and about 3.2 parts of water are mixed in an injection mixer as described in U.S. Reissue Patent 24,514. The resulting cellular polyurethane plastic has the following physical properties:

Density _____ lbs./ft.³__ 2
Tensile strength _____ lbs./in.²__ 17
Elongation _____ percent__ 280

(b) About 500 parts of each of the acids set forth below are heated to a temperature of about 180° C. and maintained at this temperature while about 100 parts of the cellular polyurethane prepared in Example 1(a) which has been cut with scissors into strips about 4 x ½ x ½ inches are added with agitation. Gas is evolved during the reaction and the cellular polyurethane strips gradually dissolve. The time for complete reaction is shown as evidenced by gas evolution essentially ceasing.

Acid: Reaction time, hours
  Tall oil pitch _____ 8
  Dioleic acid _____ 5
  Diglycollic acid _____ 4
  Stearic acid [1] _____ 4

[1] 150 parts of cellular polyurethane plastic dissolved.

*Example 2*

(a) About 100 parts of a polyester having a molecular weight of about 2000, an hydroxyl number of about 56 and an acid number of less than about 1, prepared by condensing about 1 mol of adipic acid with about 1.09 mols of ethylene glycol at a temperature of about 200° C. for about 35 hours, are reacted with about 40 parts of 4,4'-diphenylmethane diisocyanate at a temperature of about 125° C. to prepare an isocyanate-modified polyester having about 6.5 percent —NCO available for further reaction. This isocyanate-modified polyester is then mixed with about 9 parts of 1,4-butane diol and cast in a mold. A solid casting is obtained.

(b) About 500 parts of stearic acid are heated to a temperature of about 183° C. and then strips of the solid polyurethane prepared in Example 2(a) which had been cut into strips of about ¼ x ¼ x 2 inches are added and the temperature is raised to about 200 to about 220° C. and held at this temperature until gas evolution essentially ceases. A total of about 150 parts of the polyurethane is added and the total reaction time is about 4 hours.

(c) About 100 parts of a polypropylene ether glycol having a molecular weight of about 2000 and an hydroxyl number of about 56 are mixed with about 39.25 parts of 4,4'-diisocyanato diphenylmethane and heated to a temperature of about 80° C. for about 3 hours to prepare a prepolymer which has free —NCO content of about 6.4 percent. About 100 parts of this prepolymer is mixed with about 20 parts of carbon black, 8.2 parts of the diethyl ether of hydroquinone and about 2.4 parts of trimethylolpropane. The mixture is poured into a mold and heated for about 16 hours at about 110° C. An elastomeric non-porous polyurethane plastic is obtained.

(d) The procedure of Example 2(b) is repeated expect that the polyurethane of Example 2(c) is used. The reaction time is about 3 hours and the total of about 150 parts of the polyurethane are added.

*Example 3*

(a) About 100 parts of tall oil are heated to about 200° C. and then about 20 parts of a cellular polyurethane plastic prepared in Example 1(a) which have been passed through a roller mill, one roll of which is rotating at a velocity of about 30 r.p.m. and the other at about 36 r.p.m., the space between the rollers being about .005 inch, is added to the hot tall oil with agitation. The cellular polyurethane immediately dissolves.

(b) The procedure of Example 3(a) is repeated except that a cellular polyurethane plastic is used which has been prepared as follows:

A blend of polyesters one of which is obtained by the condensation of adipic acid and diethylene glycol and the other of which is obtained by the condensation of adipic acid, diethylene glycol and trimethylolpropane to a molecular weight of about 2000 is prepared. The composite hydroxyl number of the blend of polyesters is about 52, acid number of the blend is less than two and the viscosity is about 800 cp./25° C. About 100 parts of this blend of polyesters are mixed with about 40 parts of a mixture of 80 percent 2,4- and 20 percent 2,6-toluylene diisocyanate, about 2.5 parts of N-ethyl morpholine, about 1 part of diethylamine oleate, about 1.7 parts of water and about 3 parts of sulphonated castor oil which contains about 53 weight percent water with a machine mixer as disclosed in U.S. Reissue Patent 24,514. The reaction mixture is discharged into a mold where it reacts and expands to form a cellular polyurethane plastic which has a density of about 2 lbs./ft.$^3$.

*Example 4*

(a) A polyurea is prepared by reacting equi-molar parts of di-3-(aminopropyl)-ether of tripropylene glycol with a mixture of 80 percent 2,4- and 20 percent 2,6-toluylene diisocyanate by heating the mixture to a temperature of about 200 to 220° C. for about 5 hours. This solid product is then dissolved in tall oil by heating it in accordance with the procedure of Example 3(a).

It is to be understood that the foregoing examples are only illustrative and that any other suitable polyurethane, polyurea, carboxylic acid or the like could have been used therein in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The method of at least partially liquefying a member selected from the group consisting of solid polyurethanes and solid polyureas which comprises heating said member in a liquid carboxylic acid having a molecular weight below about 5000 and an acid number greater than about 25 until said member is liquid.

2. The method of at least partially liquefying solid polyurethanes which comprises heating said member in a liquid carboxylic acid having a molecular weight below about 500 and an acid number greater than about 25 until said solid polyurethane is liquid.

3. The method of at least partially liquefying a member selected from the group consisting of solid polyurethanes and solid polyureas which comprises heating said member in a liquid carboxylic acid having a molecular weight below about 5000 and an acid number greater than about 25 to a temperature of at least about 150° C. until said member is liquid.

4. The method of at least partially liquefying a member selected from the group consisting of solid polyurethanes and solid polyureas which comprises heating said member in a liquid carboxylic acid having a molecular weight below about 5000 and an acid number greater than about 25 to a temperature of at least about 200° C. until said member is liquid.

5. The method of claim 1 wherein said carboxylic acid is tall oil.

6. The method of dissolving a cellular polyurethane plastic which comprises heating said polyurethane in a liquid carboxylic acid having a molecular weight below about 5000 and an acid number greater than about 25 to a temperature of at least about 150° C. until said member is liquid.

7. A method of liquefying a cellular polyurethane plastic prepared by a process which comprises reacting an organic polyisocyanate with an organic compound containing at least two active hydrogen containing groups as determined by the Zerewitinoff method in the presence of a blowing agent which comprises heating said cellular polyurethane while it is mixed with tall oil to a temperature of at least about 150° C. until said polyurethane is liquid.

References Cited in the file of this patent

UNITED STATES PATENTS

| | | |
|---|---|---|
| 2,877,212 | Seligman | Mar. 10, 1959 |
| 2,937,151 | Ten Broeck et al. | May 17, 1960 |
| 2,968,575 | Mallonee | Jan. 17, 1961 |
| 2,983,693 | Sievers | May 9, 1961 |

FOREIGN PATENTS

| | | |
|---|---|---|
| 805,561 | Great Britain | Dec. 10, 1958 |
| 822,446 | Great Britain | Oct. 28, 1959 |

UNITED STATES PATENT OFFICE
CERTIFICATE OF CORRECTION

Patent No. 3,109,824     November 5, 1963

Herbert L. Heiss

It is hereby certified that error appears in the above numbered patent requiring correction and that the said Letters Patent should read as corrected below.

Column 1, lines 66 and 67, for "polyurea of polyurethane" read -- polyurea or polyurethane --; column 4, line 59, for "expect" read -- except --; column 6, line 2, for "500" read -- 5000 --.

Signed and sealed this 14th day of July 1964.

(SEAL)

Attest:

ESTON G. JOHNSON
Attesting Officer

EDWARD J. BRENNER
Commissioner of Patents